United States Patent
Escolle (10) Patent No.: US 10,052,748 B2
(45) Date of Patent: Aug. 21, 2018

(54) SEALING DEVICE FOR A HYDRAULIC PERCUSSION APPARATUS, AND HYDRAULIC PERCUSSION APPARATUS COMPRISING SUCH A SEALING DEVICE

(71) Applicant: MONTABERT, Saint-Priest (FR)

(72) Inventor: Michel Escolle, Nievroz (FR)

(73) Assignee: MONTABERT, Saint-Priest (FR)

( * ) Notice: Subject to any disclaimer, the term of this patent is extended or adjusted under 35 U.S.C. 154(b) by 534 days.

(21) Appl. No.: 14/435,855

(22) PCT Filed: Oct. 11, 2013

(86) PCT No.: PCT/EP2013/071269
§ 371 (c)(1),
(2) Date: Apr. 15, 2015

(87) PCT Pub. No.: WO2014/060304
PCT Pub. Date: Apr. 24, 2014

(65) Prior Publication Data
US 2015/0251304 A1    Sep. 10, 2015

(30) Foreign Application Priority Data
Oct. 15, 2012   (FR) ...................................... 12 59801

(51) Int. Cl.
*B25D 17/06* (2006.01)
*B25D 9/12* (2006.01)
(Continued)

(52) U.S. Cl.
CPC ............... *B25D 17/06* (2013.01); *B25D 9/12* (2013.01); *F16J 9/06* (2013.01); *F16J 9/20* (2013.01);
(Continued)

(58) Field of Classification Search
CPC .................................. B25D 17/06; B25D 9/12
(Continued)

(56) References Cited

U.S. PATENT DOCUMENTS 4,953,876 A * 9/1990 Muller ................... F16J 15/164
277/556
5,149,107 A * 9/1992 Maringer ............. F16J 15/3208
277/556
(Continued)

FOREIGN PATENT DOCUMENTS

WO    2011/123020 A1    10/2011

OTHER PUBLICATIONS

Mar. 18, 2014 International Search Report issued in International Patent Application No. PCT/EP2013/071269.

*Primary Examiner* — Andrew M Tecco
*Assistant Examiner* — Praachi M Pathak
(74) *Attorney, Agent, or Firm* — Oliff PLC (57) ABSTRACT

The sealing device includes an inner sealing ring including an annular inner sealing portion provided with a sealing lip intended to cooperate in a sealed manner with the outer surface of a striking piston of a hydraulic percussion apparatus, and an outer sealing element mounted around the inner sealing portion and intended to bear in a sealed manner at the bottom of an annular housing arranged on a guide body of the hydraulic percussion apparatus. The inner sealing ring further includes an annular protective portion axially shifted relative to the inner sealing portion and internally delimited by at least one converging protective surface, annular and converging towards the sealing lip, and an annular groove opening into the inside the inner sealing ring, the annular groove being disposed between the sealing lip and the converging protective surface.

17 Claims, 3 Drawing Sheets

(51) Int. Cl.
*F16J 15/3208* (2016.01)
*F16J 9/06* (2006.01)
*F16J 9/20* (2006.01)
*F16J 9/22* (2006.01)

(52) U.S. Cl.
CPC ............ *F16J 9/22* (2013.01); *F16J 15/3208* (2013.01); *B25D 2222/54* (2013.01); *B25D 2222/57* (2013.01); *B25D 2250/345* (2013.01); *B25D 2250/365* (2013.01)

(58) Field of Classification Search
USPC ........................................................ 173/210
See application file for complete search history.

(56) References Cited

U.S. PATENT DOCUMENTS

2004/0251636 A1* 12/2004 Jordan .................. F16J 15/164
277/553
2013/0000939 A1 1/2013 Jonsson

* cited by examiner

SEALING DEVICE FOR A HYDRAULIC PERCUSSION APPARATUS, AND HYDRAULIC PERCUSSION APPARATUS COMPRISING SUCH A SEALING DEVICE

The present invention concerns a sealing device for a hydraulic percussion apparatus, and a hydraulic percussion apparatus comprising such a sealing device.

In general, the hydraulic percussion apparatuses, of the rock breaker type or drill type, are equipped with a guide body comprising a bore, and with a striking piston slidably mounted inside the bore and arranged so as to be alternately driven in translation by an incompressible fluid. In the particular case of a hydraulic rotary-percussive apparatus, that is to say of the drill type, the striking piston may further be optionally driven in rotation about its longitudinal axis.

In order to ensure sealing between the guide body and the striking piston of a hydraulic percussion apparatus, and hence avoid loss of the incompressible fluid, the guide body includes an annular housing, coaxial to the striking piston and opening into the bore, in which a sealing device is mounted.

A first type of known sealing device consists of an integral sealing gasket presenting a U-shaped section and thus including a first inner sealing lip intended to cooperate with the outer surface of the striking piston in order to ensure dynamic sealing between the sealing gasket and the moving striking piston, and an outer sealing lip intended to cooperate with the bottom of the annular housing of the guide body in order to ensure static sealing between the sealing gasket and the guide body.

Such a sealing device ensures a satisfactory sealing at low translation velocity and low striking frequency of the striking piston.

However, during translational displacements of the striking piston, the contact between such a sealing device and the striking piston causes a non-negligible rubbing, and hence a frictional heating of the striking piston which may go to the destruction of the inner sealing lip.

In addition, in the case of a hydraulic rotary-percussive apparatus, the rotation of the striking piston without translation of the latter does not allow ensuring proper lubrication and cooling of the inner sealing lip. This results in a quick destruction of the inner sealing lip.

A second type of known sealing device consists of a sealing device comprising:
  an inner sealing ring comprising an annular inner sealing portion provided with a sealing lip intended to cooperate in a sealed manner with the outer surface of the striking piston, and
  an annular outer sealing element distinct from the inner sealing ring and mounted around the inner sealing portion, the outer sealing element being intended to bear in a sealed manner at the bottom of the annular housing receiving the sealing device.

Such a sealing device ensures a satisfactory sealing at high translation velocity and significant striking frequency of the striking piston, and a low rubbing on the striking piston, hence a low frictional heating of the sealing lip.

Nonetheless, in some operation conditions of a hydraulic percussion apparatus, the sealing lip of such a sealing device may be subjected to strong pressure peaks, generated by very rapid reciprocating movements of the incompressible fluid controlling the displacements of the striking piston, which may lead to the breakage of the sealing lip, and hence to leakages of incompressible fluid.

The present invention aims to overcome this drawback.

Hence, the technical problem underlaying the invention consists in providing a sealing device that is simple in structure, economical and reliable.

To this end, the present invention concerns a sealing device for a hydraulic percussion apparatus equipped with a guide body comprising a bore, and a striking piston slidably mounted inside the bore, the sealing device being intended to be mounted in an annular housing arranged on the guide body and opening into the bore so as to achieve sealing between the guide body and the striking piston, the sealing device comprising at least:
  one inner sealing ring comprising an inner sealing portion, the inner sealing portion being annular and including a sealing lip intended to cooperate in a sealed manner with the outer surface of the striking piston,
  one outer sealing element distinct from the inner sealing ring and mounted around the inner sealing portion, the outer sealing element being annular and intended to bear in a sealed manner at the bottom of the annular housing,
  characterized in that the inner sealing ring includes:
  an annular protective portion axially shifted relative to the inner sealing portion, the protective portion being internally delimited by at least one converging protective surface, the converging protective surface being annular and converging towards the sealing lip, and
  an annular groove opening into the inside of the inner sealing ring, the annular groove being disposed between the sealing lip and the converging protective surface,
  and in that the protective portion is arranged so as to delimit, in operation conditions, an annular flowing passageway with the striking piston.

The configuration of the converging protective surface allows to form, with the outer surface of the striking piston, a progressive annular nozzle adapted to progressively reduce the thickness and the flow rate of the incompressible fluid flowing towards the sealing lip, and hence to reduce the amplitude of the pressure peaks generated by the flowing of the incompressible fluid.

Furthermore, the presence of the annular groove between the sealing lip and the converging protective surface allows to reduce the inlet velocity of the incompressible fluid on the sealing lip by increasing the passage surface of the incompressible fluid, which allows further to damp the residual pressure peaks.

Thus, the configuration of the inner sealing ring allows to significantly reduce the amplitude of the aforementioned pressure peaks, and hence to avoid breakage of the sealing lip. Therefore, the sealing device according to the invention presents an enhanced reliability compared to that of the sealing devices of the prior art.

Furthermore, the presence of the converging protective surface and the annular groove on the inner sealing ring allows to ensure, with a same device, on the one hand, sealing between the striking piston and the guide body in which the striking piston is mounted, and on the other hand, protection of the sealing lip. This results in reducing the number of the constitutive parts of the percussion apparatus and the number of machining operations to be performed in the guide body of the percussion apparatus, which significantly reduces the manufacturing costs of the latter.

Advantageously, the flowing passageway opens into the annular groove.

According to an embodiment of the invention, the sealing lip protrudes radially inwardly relative to the protective portion.

Advantageously, the outer sealing element is arranged so as to exert a compressive force on the inner sealing portion in use conditions.

According to an embodiment of the invention, the annular groove is delimited by the sealing lip and the protective portion.

Preferably, the converging protective surface extends from an end of the inner sealing ring.

According to an embodiment of the invention, the converging protective surface presents an apex angle comprised between 10 and 40°. Therefore, the axial components of the hydraulic forces resulting from the pressure peaks remain low on the converging protective surface.

According to an embodiment of the invention, the protective portion extends longitudinally along more than half of the length of the inner sealing ring.

According to an embodiment of the invention, the converging protective surface extends longitudinally over at least 20% of the length of the inner sealing ring.

According to a feature of the invention, the protective portion is further internally delimited by at least one annular diverging protective surface and diverging towards the sealing lip, the diverging protective surface being disposed between the converging protective surface and the sealing lip, and delimiting at least partially the annular groove.

According to an embodiment of the invention, the diverging protective surface presents an apex angle smaller than 140°.

According to an embodiment of the invention, the diverging protective surface presents a radial height of at least five-tenths of a millimeter.

According to an embodiment of the invention, the converging protective surface and/or the diverging protective surface are substantially truncated cone-shaped.

Preferably, the protective portion is further internally delimited by at least one intermediate protective surface, substantially cylindrical and disposed between the converging protective surface and the annular groove. The presence of such an intermediate protective surface allows to form, with the outer surface of the striking piston, an annular nozzle adapted to significantly reduce the flow rate of the incompressible fluid coming from the converging protective surface, and hence the associated pressure fluctuations. This results in further improving the protection of the sealing lip.

According to an embodiment of the invention, the intermediate protective surface is disposed between the converging protective surface and the diverging protective surface. Preferably, the intermediate protective surface extends in the extension of the converging protective surface.

Advantageously, the diverging protective surface extends in the extension of the intermediate protective surface. Such an arrangement of the diverging protective surface allows to transform the purely axial component of the velocity of the incompressible fluid coming from the intermediate protective surface into an axial component and a radial component, and hence to further reduce the inlet velocity of the incompressible fluid on the sealing lip.

Advantageously, at least one among the converging, intermediate and diverging protective surfaces extends substantially coaxially with the longitudinal axis of the inner sealing ring. Advantageously, the converging, intermediate and diverging protective surfaces extend substantially coaxially with the longitudinal axis of the inner sealing ring.

Advantageously, the sealing device comprises a holding element distinct from the inner sealing ring and mounted around the protective portion, the holding element being annular and intended to bear in a sealed manner at the bottom of the annular housing. These arrangements allow keeping the space between the striking piston and the first, second and third protective surfaces substantially constant regardless of the pressure of the incompressible fluid. This results in a protection against the pressure peaks of the fluid, almost independent of the average pressure level of the latter.

Advantageously, the holding element is arranged to exert a compressive force on the protective portion in use conditions.

According to an embodiment of the invention, the sealing device is arranged so that the compressive forces exerted by the outer sealing element on the inner sealing portion are higher than the compressive forces exerted by the holding element on the protective portion.

Preferably, the holding element is axially shifted from the outer sealing element.

According to an embodiment of the invention, the outer sealing element and the holding element include respectively a first and a second inner bearing surfaces, and the inner sealing portion and the protective portion include respectively a first and a second outer bearing surfaces arranged to cooperate respectively with the first and second inner bearing surfaces. These arrangements allow to increase the rubbing exerted on the outer surface of the inner sealing ring, and thus to limit, during a possible rotation of the striking piston about its longitudinal axis, the risks of a relative rotation between the inner sealing ring and the outer sealing element. This results in reducing the risks of wear of the sealing device at the interface between the inner sealing ring and the outer sealing element, and hence the risks of leakage between the guide body and the striking piston.

According to an embodiment of the invention, the distance between the bearing point of the first inner and outer bearing surfaces and the bearing point of the second inner and outer bearing surfaces is larger than the radial height of the inner sealing ring. These arrangements allow improving the stability of the inner sealing ring, and hence of the sealing lip of the latter, which further reduces the risks of leakage between the guide body and the striking piston. Improving the stability of the inner sealing ring further allows to ensure an operation of the sealing device in an optimal operation position, which further reduces the wear rate of the sealing device.

According to an embodiment of the invention, the outer bearing surface arranged on the protective portion is substantially cylindrical and extends substantially parallel to the longitudinal axis of the inner sealing ring.

According to an embodiment of the invention, the outer bearing surface arranged on the protective portion is concave.

According to an embodiment of the invention, the first and second inner bearing surfaces are substantially cylindrical and extend substantially parallel to the longitudinal axis of the inner sealing ring.

According to an embodiment of the invention, the first and second outer bearing surfaces are substantially cylindrical and extend substantially parallel to the longitudinal axis of the inner sealing ring.

According to an embodiment of the invention, the first and second outer bearing surfaces extend in the extension of one another.

According to a first variant of the invention, the holding element is in one-piece with the outer sealing element. Thus, the holding element and the sealing element are integral.

According to a second variant of the invention, the holding element and the outer sealing element are distinct from each other.

According to an embodiment of the invention, the holding element and the outer sealing element are formed respectively by two o-ring gaskets having identical or different sections and/or identical or different radii. According to an embodiment of the invention, the holding element presents a section smaller than that of the outer sealing element.

According to an embodiment of the invention, the holding element is formed by a four-lobed annular gasket, and more specifically an annular gasket comprising a four-lobed section, namely two radially inner lobes and two radially outer lobes.

According to an embodiment of the invention, the sealing lip includes a sealing edge intended to cooperate in a sealed manner with the outer surface of the striking piston.

Preferably, the inner sealing ring includes, at each of its ends, an annular outer chamfer. The presence of such chamfers allows facilitating the mounting of the sealing device in the annular housing arranged on the guide body, and also avoiding damage of the inner sealing ring on the edges of the annular housing, that is to say the edges delimited by the side faces of the annular housing and the inner wall of the guide body, which might adversely affect the sealing between the sealing device and the striking piston.

According to an embodiment of the invention, each outer chamfer extends longitudinally and radially over at least two-tenths of a millimeter.

According to an embodiment of the invention, each outer chamfer presents a chamfer angle comprised between 10 and 60° relative to a plane perpendicular to the longitudinal axis of the inner sealing ring.

According to an embodiment of the invention, the protective portion comprises at least one radial notch opening into the end face of the inner sealing ring opposite to the sealing lip relative to the annular groove. According to an embodiment of the invention, the at least one radial notch also opens into the converging protective surface. According to an embodiment of the invention, the at least one radial notch further opens into the corresponding outer chamfer.

According to an embodiment of the invention, the protective portion comprises at least one inner longitudinal notch opening into the annular groove, and preferably into the diverging protective surface. According to an embodiment of the invention, the at least one longitudinal notch further opens into the converging and intermediate protective surfaces. According to an embodiment of the invention, the at least one longitudinal notch also opens into the end face of the protective portion opposite to the inner sealing portion.

According to an embodiment of the invention, the protective portion includes at least one annular slot opening into the converging protective surface and/or the intermediate protective surface.

The present invention further concerns a hydraulic percussion apparatus, comprising:
- a guide body including a bore and an annular housing arranged on the guide body and opening into the bore,
- a striking piston slidably mounted inside the bore and arranged to be alternately driven by an incompressible fluid, and
- a sealing device according to the invention mounted in the annular housing arranged on the guide body so as to achieve sealing between the guide body and the striking piston.

According to an embodiment of the invention, the guide body and the striking piston delimit an annular fluid inlet channel opening on the side of the end face of the protective portion opposite to the inner sealing portion, the inner diameter of the inner sealing ring, at said end face of the protective portion, being larger than or equal to the diameter of the bore, at the end of the fluid inlet channel facing the inner sealing ring.

In other words, the radial height of the inner sealing ring, at the end face of the protective portion opposite to the inner sealing portion, is larger than or equal to the radial height of the end of the fluid inlet channel facing the inner sealing ring.

According to an embodiment of the invention, the intermediate protective surface comprises an inner diameter comprised between a minimum value corresponding to the inner diameter of the sealing lip increased by four-tenths of a millimeter and a maximum value corresponding to the outer diameter of the striking piston increased by five-tenths of a millimeter.

Anyway, the invention will be better understood upon reading the description that follows with reference to the appended schematic drawing representing, as non-limiting examples, several embodiments of this sealing device.

Figure 1:
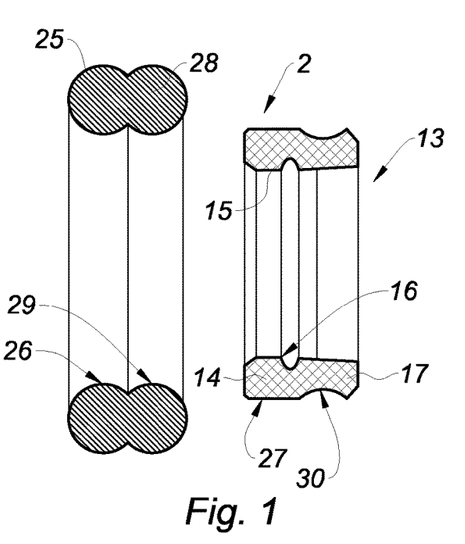
FIG. 1 is a sectional view of a sealing device according to a first embodiment of the invention.
Figure 2:
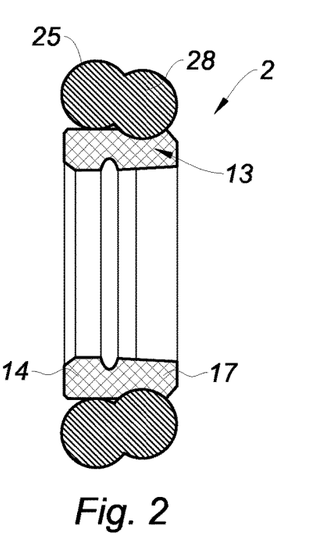
FIG. 2 is an exploded sectional view of the sealing device of FIG. 1.
Figure 3:
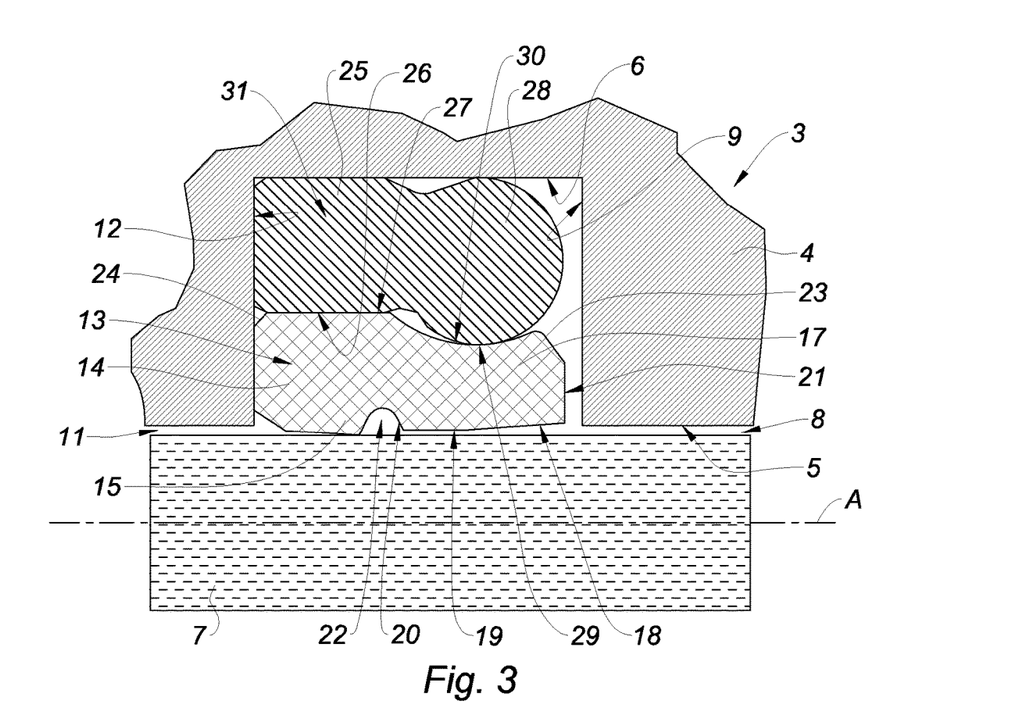
FIG. 3 is a partial sectional view of a hydraulic percussion apparatus equipped with the sealing device of FIG. 1.

FIGS. 1 to 3 represent a sealing device 2 for a hydraulic percussion apparatus 3 equipped with a guide body 4 comprising a bore 5 and an annular housing 6 opening into the bore 5, and a cylindrical-shaped striking piston 7 slidably mounted inside the bore 5 and arranged so as to be alternately driven in translation by an incompressible fluid, such as hydraulic oil. According to a variant of the invention, the sealing device 2 may be intended to equip a hydraulic rotary-percussive apparatus, and in particular a hydraulic apparatus in which the striking piston 7 and the guide body 4 may be driven in rotation relative to each other.

As shown in FIG. 3, the sealing device 2 is intended to be mounted in the annular housing 6 so as to achieve sealing between the guide body 4 and the striking piston 7, and more particularly so as to prevent passage of the incompressible fluid from a first annular fluid channel 8 delimited between the guide body 4 and the striking piston 7 and opening on the side of a first side wall 9 of the annular housing 6, toward a second annular fluid channel 11 delimited between the guide body 4 and the striking piston 7 and opening on the side of a second side wall 12 of the annular housing 6.

The sealing device 2 comprises an inner sealing ring 13. The inner sealing ring 13 may be made of hard plastic, and, for example, Teflon-based plastic. The inner sealing ring 13 comprises an annular inner sealing portion 14 which is provided with an annular sealing lip 15 intended to cooperate in a sealed manner with the outer surface of the striking piston 7. Advantageously, the sealing lip 15 includes a sealing edge 16 intended to cooperate in a sealed manner with the outer surface of the striking piston 7.

The inner sealing ring 13 further comprises an annular protective portion 17 axially shifted relative to the inner sealing portion 14. The inner sealing ring 13 is shaped so that the sealing lip 15 protrudes radially inwardly relative to the protective portion 17. Thus, the protective portion 17 is arranged to delimit, in use conditions, an annular flowing passageway with the striking piston 7.

The protective portion 17 is internally delimited by a first, a second and a third protective surfaces 18, 19, 20 extending substantially coaxially with the longitudinal axis A of the inner sealing ring 14.

The first protective surface 18 extends from an end of the inner sealing ring 13, and more particularly from an end face 21 of the protective portion 17 opposite to the inner sealing portion 14. The first protective surface 18 is advantageously truncated cone-shaped and converges towards the sealing lip 15. The first protective surface 18 presents for example an apex angle comprised between 10 and 40°. Furthermore, the first protective surface 18 may for example extend longitudinally over at least 20% of the length of the inner sealing ring 13.

The second protective surface 19 extends over the extension of the first protective surface 18 towards the sealing lip 15. The second protective surface 19 is substantially cylindrical, and preferably presents an inner diameter comprised between a minimum value corresponding to the inner diameter of the sealing lip 15 increased by four-tenths of a millimeter and a maximum value corresponding to the outer diameter of the striking piston 7 increased by five-tenths of a millimeter.

The third protective surface 20 extends over the extension of the second protective surface 19. The third protective surface 20 is truncated cone-shaped and diverges towards the sealing lip 15. According to an embodiment of the invention, the third protective surface 20 presents a radial height of at least five-tenths of a millimeter. According to an embodiment of the invention, the third protective surface 20 presents an apex angle smaller than 140°.

The inner sealing ring 13 also comprises an inner annular groove 22 intended to face the striking piston 7, the inner annular groove 22 being delimited by the sealing lip 15 and the third protective surface 20.

The inner sealing ring 13 includes, at each of its ends, an annular outer chamfer 23, 24. Each outer chamfer 23, 24 may for example extend longitudinally and radially over at least two-tenths of a millimeter. According to an embodiment of the invention, each outer chamfer 23, 24 presents a chamfer angle comprised between 10 and 60° relative to a plane perpendicular to the longitudinal axis A of the inner sealing ring 13.

The inner diameter of the inner sealing ring 13, at the end face 21 of the protective portion 17 opposite to the inner sealing portion 14, is larger than or equal to the diameter of the bore 5, at the end of the first fluid channel 8 facing the inner sealing ring 13. In other words, the radial height of the inner sealing ring 13, at the end face 21 of the protective portion 17, is larger than or equal to the radial height of the end of the first fluid channel 8 facing the inner sealing ring 13. These arrangements allow to prevent the incompressible fluid coming from the first fluid channel 8 from frontally collide with the end face 21 of the protective portion 17, which would quickly damage the inner sealing ring 13.

The sealing device 2 further comprises an annular outer sealing element 25 distinct from the inner sealing ring 13 and mounted around the inner sealing portion 14. The outer sealing element 25 is more particularly arranged to exert a radial force on the inner sealing portion 14 in use conditions. As shown in FIG. 3, the outer sealing element 25 is intended to bear in a sealed manner at the bottom of the annular housing 6. The outer sealing element 25 may for example be made of elastomer.

The outer sealing element 25 includes respectively_inner bearing surface 26, and the inner sealing portion 14 includes an outer bearing surface 27 arranged to cooperate with the inner bearing surface 26 of the outer sealing element 25. According to an embodiment represented in FIGS. 1 to 3, the outer bearing surface 27 arranged on the inner sealing portion 14 is cylindrical and extends substantially parallel to the longitudinal axis A of the inner sealing ring 13.

The sealing device 2 further comprises an annular holding element 28 distinct from the inner sealing ring 13 and mounted around the protective portion 17. The holding element 28 is more particularly arranged to exert a radial force on the protective portion 17 in use conditions. The holding element 28 is axially shifted from the outer sealing element 25 and is intended to bear in a sealed manner at the bottom of the annular housing 6. The holding element 28 may for example be made of elastomer.

The holding element 28 includes an inner bearing surface 29, and the protective portion 17 includes an outer bearing surface 30 arranged so as to cooperate with the inner bearing surface 29 of the holding element 28. According to the embodiment represented in FIGS. 1 to 3, the outer bearing surface 30 arranged on the protective portion 17 is concave. Advantageously, the bottom of the concavity of the outer bearing surface 30 is closer to the longitudinal axis A of the inner sealing ring 13 than the outer bearing surface 27.

The distance between the bearing point of the inner and outer bearing surfaces 26, 27 and the bearing point of the inner and outer bearing surfaces 29, 30 is preferably larger than the radial height of the inner sealing ring 13 so as to improve the stability of the latter.

According to the embodiment represented in FIGS. 1 to 3, the holding element 28 is in one-piece with the outer sealing element 25. Thus, the holding element 28 and the outer sealing element 25 form an outer sealing ring 31 mounted around the inner sealing ring 13.

According to the embodiment represented in FIGS. 1 to 3, the outer sealing ring 31 is symmetrical relative to a plane of symmetry perpendicular to the longitudinal axis A of the inner sealing ring 13 and extending between the holding element 28 and the outer sealing element 25. These arrangements allow to ensure the mounting the outer sealing ring 31 on the inner sealing ring 13 in both directions, which limits mounting errors.

Advantageously, the sealing device 2 is shaped so that the compressive forces exerted by the outer sealing element 25 on the inner sealing portion 14 are higher than the compressive forces exerted by the holding element 28 on the protective portion 17. When the outer sealing ring is symmetrical, then it is the geometry of the inner sealing ring 13, and more particularly of the outer bearing surfaces 27, 30 arranged on the inner sealing portion 14 and the protective portion 17, which is adapted so that the compressive forces exerted by the outer sealing element 25 on the inner sealing portion 14 are higher than the compressive forces exerted by the holding element 28 on the protective element 17.

The advantages resulting from the structure of the sealing device 2 according to the invention, and more particularly the protective portion 17 of the latter, will be explained hereinafter.

When alternately driving in translation the striking piston 7 inside the guide body 4, pressurized incompressible fluid flows at high velocity in the first fluid channel 8 towards the protective portion 17.

The incompressible fluid coming from the first fluid channel 8 flows first in a first annular passageway, delimited by the outer surface of the striking piston 7 and the first protective surface 18, which then forms a progressive annular nozzle adapted to progressively reduce the thickness and the flow rate of the incompressible fluid coming from the fluid channel 8, and hence reduce the amplitude of the pressure peaks generated by the flowing of the incompressible fluid.

Afterwards, the incompressible fluid coming from a first annular passageway flows in a second annular passageway, delimited by the outer surface of the striking piston 7 and the second protective surface 19, which then forms an annular nozzle adapted to significantly reduce the flow rate of the incompressible fluid coming from the first protective surface 18, and hence the associated pressure fluctuations.

Finally, the small amount of oil coming from the second annular passageway flows in a significant annular volume delimited by the annular groove 22 and the outer surface of the striking piston 7. The presence of such an annular volume allows further to reduce the inlet velocity of the incompressible fluid on the sealing lip by increasing the passage surface of the fluid, which allows further to damp the residual pressure peaks reaching the sealing lip 15.

The configuration of the first, second and third protective surfaces 18, 19, 20 and of the annular groove 22 allows thus to protect the sealing lip 15 from the strong pressure peaks of the incompressible fluid, and therefore improve the reliability of the sealing device 2.

Figure 4:
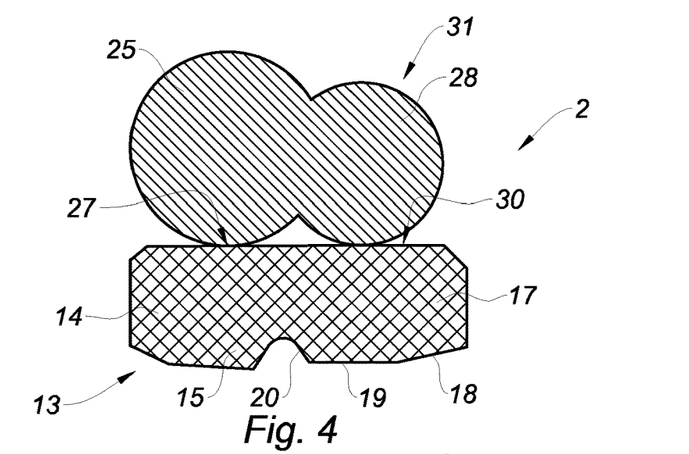
FIGS. 4 to 10 are partial sectional views of sealing devices according to other embodiments of the invention.

FIG. 4 represents a second embodiment of the sealing device 2 which differs from the one represented in FIGS. 1 to 3 essentially in that the holding element 28 presents a radial height and a section smaller than those of the outer sealing element 25, and in that the outer bearing surfaces 27, 30 arranged respectively on the inner sealing portion 14 and the protective portion 17 are cylindrical and extend parallel to the longitudinal axis A of the inner sealing ring 13 and in the extension of one another. Such a design of the holding element 28 allows in particular to increase the section of the protective portion 17, and hence to enhance the breaking strength of the latter.

Figure 5:
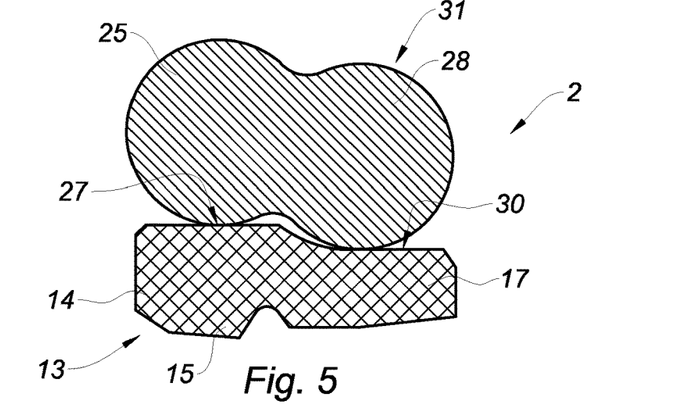

FIG. 5 represents a third embodiment of the sealing device 2 which differs from the one represented in FIGS. 1 to 3 essentially in that the outer bearing surface 30 arranged on the protective portion 17 is cylindrical and extends parallel to the longitudinal axis A of the inner sealing ring 13, and in that the outer bearing surface 30 is radially set back from the outer bearing surface 27 arranged on the outer sealing portion 14. These arrangements allow to limit the risks of axial displacement of the inner sealing ring in opposition to the inlet of the hydraulic fluid, and also reduce the section of the protective portion 17, hence to facilitate the mounting of the inner sealing ring 13 in the annular housing 6.

Figure 6:
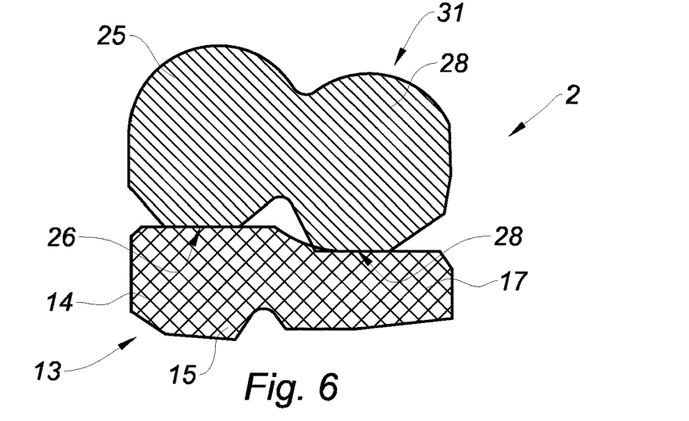

FIG. 6 represents a fourth embodiment of the sealing device 2 which differs from the one represented in FIG. 5 essentially in that the inner bearing surfaces 26, 29 arranged respectively on the outer sealing element 25 and the holding element 28 are cylindrical and extend parallel to the longitudinal axis A of the inner sealing ring 13. These arrangements allow to improve the stability of the sealing device 2.

Figure 7:
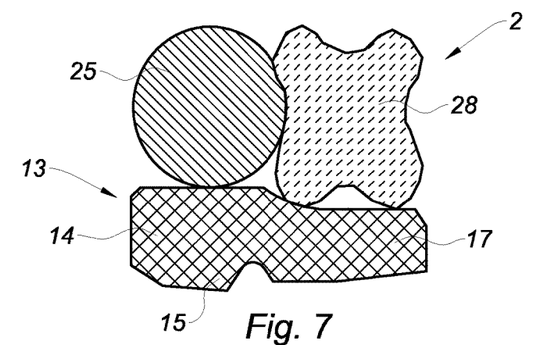

FIG. 7 represents a fifth embodiment of the sealing device 2 which differs from the one represented in FIG. 5 essentially in that the holding element 28 and the outer sealing element 25 are distinct from each other. According to this embodiment of the invention, the outer sealing element 25 is formed by an o-ring gasket and the holding element 28 is formed by a four-lobed annular gasket, and more specifically an annular gasket comprising a four-lobed section, namely two radially inner lobes and two radially outer lobes. Such a configuration of the holding element 28 allows to distribute the compressive forces exerted by the holding element 28 on the protective portion 17 into two application points, and hence distribute more evenly these compressive forces.

Figure 8:
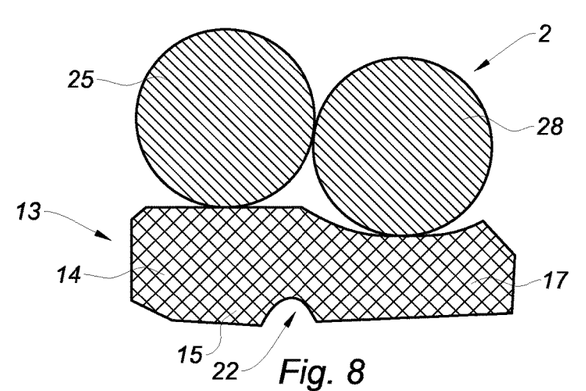

FIG. 8 represents a fifth embodiment of the sealing device 2 which differs from the one represented in FIGS. 1 to 3 essentially in that the holding element 28 and the outer sealing element 25 are respectively formed by two o-ring gaskets having identical sections and radii. These arrangements allow to reduce the manufacturing costs of the sealing device 2.

Figure 9:
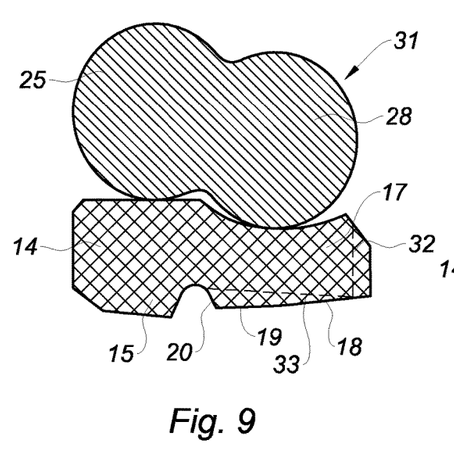

FIG. 9 represents a sixth embodiment of the sealing device 2 which differs from the one represented in FIGS. 1 to 3 essentially in that the protective portion 17 comprises at least one radial notch 32 opening into the end face 21 of the protective portion 17 and/or at least one inner longitudinal notch 33 opening into the first, second and third protective surfaces 18, 19, 20.

The presence of a radial notch 32 as defined above allows, in the case of a displacement of the sealing device 2 in contact with the side wall 9 of the annular housing 6 due to a high pressure of the liquid coming from the fluid channel 11, to ensure passage of the fluid coming from the fluid channel 8 between the end face 21 of the protective portion 17 and the side wall 23 of the annular housing 6, and hence a return of the sealing device 2 to its optimal operation position, as represented in FIG. 3.

The presence of an inner longitudinal notch 33 as defined above allows to decompress the annular volume delimited by the sealing lip 15 and the third protective surface 20 in the case where an unexpected high pressure is created in this annular volume. These arrangements allow thus to limit the risks of damage of the sealing device 2.

Advantageously, the or each radial notch 32 also opens into the first protective surface 18 and into the outer chamfer 23.

According to a variant, the or each inner longitudinal notch 33 can also open into the end face 21 of the protective portion 17.

Figure 10:
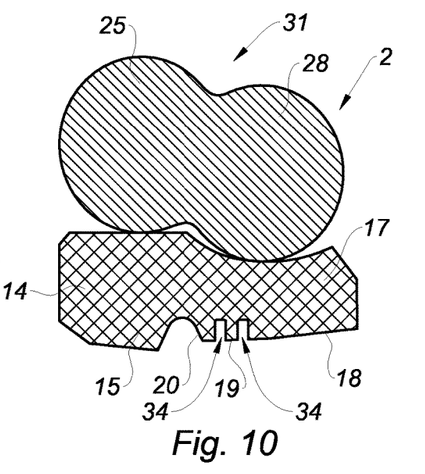

FIG. 10 represents a sixth embodiment of the sealing device 2 which differs from the one represented in FIGS. 1 to 3 essentially in that the protective portion 17 includes at least one annular slot 34 opening into the second protective surface 19, and for example two axially shifted annular slots 34. Such an annular slot 34 allows to generate an annular decompression chamber, and hence enhance the cumulative effect of the second and third protective surfaces 19, 20. This results in improving the protection of the sealing lip 15. According to a variant, the protective portion 17 may include at least one annular slot opening into the first protective surface 18.

It goes without saying that the invention is not limited to the sole embodiments of this sealing device, described above as examples, but encompasses all the variants.

The invention claimed is:

1. A sealing device for a hydraulic percussion apparatus equipped with a guide body comprising a bore, and with a striking piston slidably mounted inside the bore, the sealing device being configured to be mounted in an annular housing arranged on the guide body and opening into the bore so as to achieve sealing between the guide body and the striking piston, the sealing device comprising:

one inner sealing ring comprising an inner sealing portion, the inner sealing portion being annular and including a sealing lip to sealingly cooperate with the outer surface of the striking piston, one outer sealing element distinct from the inner sealing ring and mounted around the inner sealing portion, the outer sealing element being annular and configured to sealingly bear at the bottom of the annular housing, wherein the inner sealing ring includes:

an annular protective portion axially shifted relative to the inner sealing portion, the protective portion being internally delimited by at least one converging protective surface, the converging protective surface being annular and converging towards the sealing lip, and an annular groove opening into the inside of the inner sealing ring, the annular groove being disposed between the sealing lip and the converging protective surface, wherein the protective portion is arranged to delimit, in use, an annular flowing passageway with the striking piston, and wherein the protective portion is further internally delimited by at least one diverging protective surface, the diverging protective surface being annular and diverging towards the sealing lip, the diverging protective surface being disposed between the converging protective surface and the sealing lip, and delimiting at least partially the annular groove.

2. The sealing device according to claim 1, wherein the converging protective surface extends from an end of the inner sealing ring.

3. The sealing device according to claim 1, wherein the converging protective surface and/or the diverging protective surface are substantially truncated cone-shaped.

4. The sealing device according to claim 1, wherein the protective portion is further internally delimited by at least one intermediate protective surface, substantially cylindrical and disposed between the converging protective surface and the annular groove.

5. The sealing device according to claim 4, wherein the intermediate protective surface is disposed between the converging protective surface and the diverging protective surface.

6. The sealing device according to claim 4, wherein the intermediate protective surface extends in the extension of the converging protective surface.

7. The sealing device according to claim 4 wherein the diverging protective surface extends in the extension of the intermediate protective surface.

8. The sealing device according to claim 1, wherein at least one among the converging, intermediate and diverging protective surfaces extends substantially coaxially with the longitudinal axis of the inner sealing ring.

9. The sealing device according to claim 1, further comprising a holding element distinct from the inner sealing ring and mounted around the protective portion the holding element being annular and configured to sealingly bear at the bottom of the annular housing.

10. The sealing device according to claim 9, wherein the outer sealing element and the holding element respectively include a first and a second inner bearing surfaces, and wherein the inner sealing portion and the protective portion include respectively a first and a second outer bearing surfaces arranged to cooperate respectively with the first and second inner bearing surfaces.

11. The sealing device according to claim 1, wherein the inner sealing ring includes, at each of its axial ends, an annular outer chamfer.

12. The sealing device according to claim 1, wherein the protective portion comprises at least one radial notch opening into the end face of the inner sealing ring opposite to the sealing lip relative to the annular groove.

13. The sealing device according to claim 1, wherein the protective portion comprises at least one inner longitudinal notch opening into the annular groove.

14. The sealing device according to claim 1, wherein the protective portion includes at least one annular slot opening into the converging protective surface and/or the intermediate protective surface.

15. A hydraulic percussion apparatus comprising:

a guide body including a bore and an annular housing arranged on the guide body and opening into the bore, a striking piston slidably mounted inside the bore and arranged to be alternately driven by an incompressible fluid, and a sealing device according to claim 1, mounted in the annular housing arranged on the guide body to achieve sealing between the guide bod and the striking piston.

16. A sealing device for a hydraulic percussion apparatus equipped with a guide body comprising a bore, and with a striking piston slidably mounted inside the bore, the sealing device being configured to be mounted in an annular housing arranged on the guide body and opening into the bore so as to achieve sealing between the guide body and the striking piston, the sealing device comprising:

one inner sealing ring comprising an inner sealing portion, the inner sealing portion being annular and including a sealing lip to sealingly cooperate with the outer surface of the striking piston, one outer sealing element distinct from the inner sealing ring and mounted around the inner sealing portion, the outer sealing element being annular and configured to sealingly bear at the bottom of the annular housing, wherein the inner sealing ring includes:

an annular protective portion axially shifted relative to the inner sealing portion, the protective portion being internally delimited by at least one converging protective surface, the converging protective surface being annular and converging towards the sealing lip, and an annular groove opening into the inside of the inner sealing ring, the annular groove being disposed between the sealing lip and the converging protective surface wherein the protective portion is arranged to delimit, in use, an annular flowing passageway with the striking piston, and wherein the protective portion comprises at least one radial notch opening into the end face of the inner sealing ring opposite to the sealing lip relative to the annular groove.

17. A sealing device for a hydraulic percussion apparatus equipped with a guide body comprising a bore, and with a striking piston slidably mounted inside the bore, the sealing device being configured to be mounted in an annular housing arranged on the guide body and opening into the bore so as to achieve sealing between the guide body and the striking piston, the sealing device comprising:

one inner sealing ring comprising an inner sealing portion, the inner sealing portion being annular and including a sealing lip to sealingly cooperate with the outer surface of the striking piston, one outer sealing element distinct from the inner sealing ring and mounted around the inner sealing portion, the outer sealing element being annular and configured to sealingly bear at the bottom of the annular housing, wherein the inner sealing ring includes:

an annular protective portion axially shifted relative to the inner sealing portion, the protective portion being internally delimited by at least one converging protective surface, the converging protective surface being annular and converging towards the sealing lip, and an annular groove opening into the inside of the inner sealing ring, the annular groove being disposed between the sealing lip and the converging protective surface wherein the protective portion is arranged to delimit, in use, an annular flowing passageway with the striking piston, and wherein the protective portion includes at least one annular slot opening into the converging protective surface and/or the intermediate protective surface.

* * * * *